United States Patent [19]
Burt et al.

[11] Patent Number: 5,560,797
[45] Date of Patent: Oct. 1, 1996

[54] METHODS OF MAKING FLOOR TILE AND WALL COVERING FROM EXTRUDED HOT RECYCLED VINYL THERMOPLASTIC MEMBRANE HAVING DISCRETE FIBERS RANDOMLY DISPERSED THEREIN

[75] Inventors: John R. Burt; Kenneth A. Szabo, both of Saginaw; Ronald L. Stewart, Oscoda, all of Mich.

[73] Assignee: Oscoda Plastics, Inc., Oscoda, Mich.

[21] Appl. No.: 446,536

[22] Filed: May 19, 1995

Related U.S. Application Data

[63] Continuation of Ser. No. 239,510, May 9, 1994, Pat. No. 5,466,320.

[51] Int. Cl.$^6$ .............................. B29C 47/14; B29B 17/00
[52] U.S. Cl. ........................... 156/244.19; 156/244.17; 156/244.23; 156/244.24; 156/244.27; 156/309.9; 156/324; 264/37; 264/177.2; 264/211.12
[58] Field of Search ........................... 156/244.11, 244.16, 156/244.19, 244.23, 244.24, 244.26, 244.27, 309.9, 322, 324; 264/37, 75, 176.1, 177.2, 211.12

[56] References Cited

U.S. PATENT DOCUMENTS

| | | |
|---|---|---|
| Re. 25,200 | 7/1962 | Robinson et al. . |
| 2,392,594 | 1/1946 | Karfoil et al. . |
| 2,558,378 | 6/1951 | Petry . |
| 2,571,962 | 10/1951 | Smith et al. . |
| 3,142,599 | 7/1964 | Chavannes . |
| 3,421,960 | 1/1969 | Arbit . |
| 3,470,055 | 9/1969 | Wade . |
| 3,542,613 | 11/1970 | Fox et al. . |
| 3,634,165 | 1/1972 | Gliniecki et al. . |
| 3,669,794 | 6/1972 | Mazur . |
| 3,767,510 | 10/1973 | Gustafson . |
| 3,984,509 | 10/1976 | Hall et al. . |
| 4,105,593 | 8/1978 | Stavrinou . |
| 4,122,224 | 10/1978 | Brewer et al. . |
| 4,158,646 | 6/1979 | Benkowski et al. . |
| 4,225,374 | 9/1980 | Kaufmann . |
| 4,250,222 | 2/1981 | Mavel et al. . |
| 4,312,686 | 1/1982 | Smith et al. . |
| 4,370,187 | 1/1983 | Katagiri et al. . |
| 4,379,198 | 4/1983 | Jaeschke et al. . |
| 4,405,400 | 9/1983 | Petersen-Hoj . |
| 4,417,936 | 11/1983 | Gaffney . |
| 4,418,123 | 11/1983 | Bunnelle et al. . |
| 4,448,739 | 5/1984 | Baus . |
| 4,612,074 | 9/1986 | Smith et al. . |
| 4,614,680 | 9/1986 | Fry et al. . |
| 4,661,186 | 4/1987 | De Bernardi . |
| 4,678,528 | 7/1987 | Smith et al. . |
| 4,773,959 | 9/1988 | Smith et al. . |
| 5,122,212 | 6/1992 | Ferguson et al. . |
| 5,145,617 | 9/1992 | Hermanson et al. . |
| 5,466,320 | 11/1995 | Burt et al. ............................ 156/244.19 |

*Primary Examiner*—Michael W. Ball
*Assistant Examiner*—Richard Crispino
*Attorney, Agent, or Firm*—Learman & McCulloch

[57] ABSTRACT

A method of continuously fabricating a cushiony recycled plastic floor tile or wall cover wherein a single-ply sheet, made up substantially of recycled membrane and a proportion of discrete fibers sufficient to create a cushion effect in the tile, is extruded. The fibers are reduced in length by cooling the sheet extrudate produced, chopping the sheet extrudate into particles in which the fibers are reduced in length and then passing the chopped extrudate into the extruder to reextrude it. When size reduction is achieved, the hot substrate proceeds immediately into the nip between laminating rolls and a preheated cover film selected from the group comprising transparent sheet, colored sheet, and sheet with decorative imprinting is passed on into the nip with the substrate. Compressive pressure is applied by the laminating rolls to autogeneously heat weld the substrate and cover film in surface to surface sealed contact without the imposition of air bubbles or wrinkles between them. The welded product is then cooled and cut into discrete sizes.

18 Claims, 2 Drawing Sheets

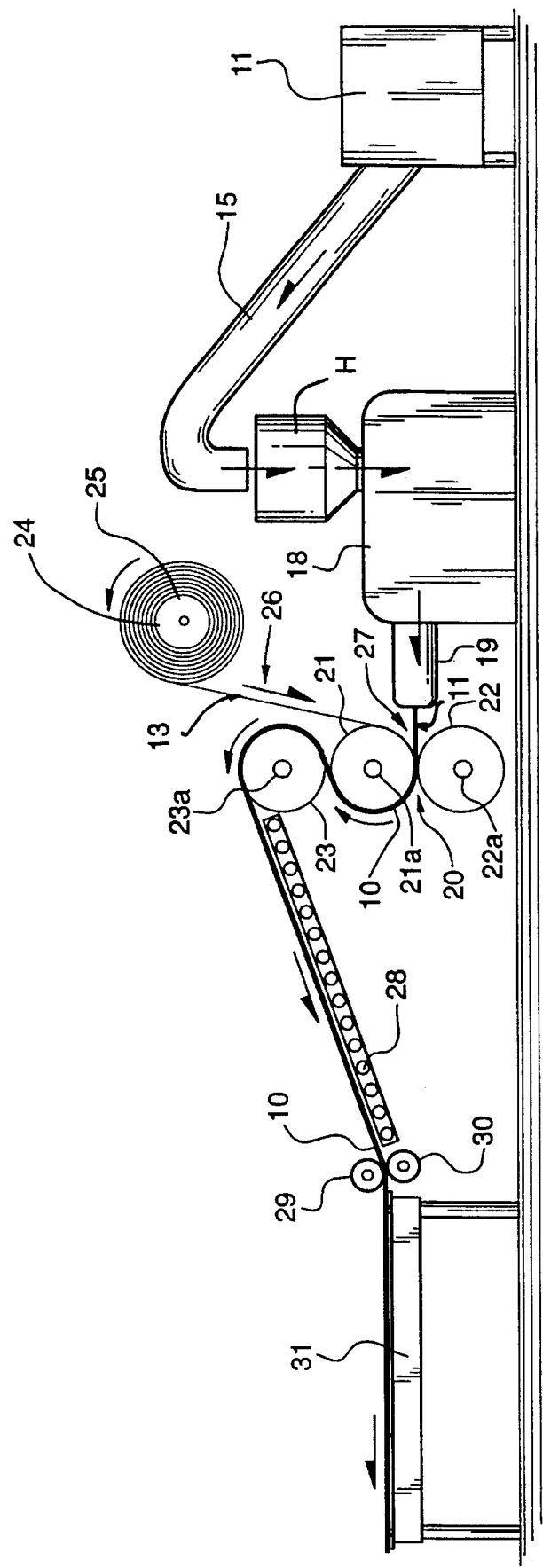

METHODS OF MAKING FLOOR TILE AND WALL COVERING FROM EXTRUDED HOT RECYCLED VINYL THERMOPLASTIC MEMBRANE HAVING DISCRETE FIBERS RANDOMLY DISPERSED THEREIN

This application is a continuation of application Ser. No. 08/239,510, filed May 9, 1994 now U.S. Pat. No. 5,466,320 issued Nov. 14, 1995.

BACKGROUND OF THE INVENTION

The invention relates primarily to the further processing of recycled extruded sheet material of the type disclosed in U.S. Pat. No. 5,145,617 entitled Method of Processing Scrap Roof-Membrane Sheet Material Comprising a Flexible Synthetic Fabric Substrate Enveloped in a Thermoplastic Plastic Envelope, which is incorporated herein by reference. In that patent, a process was disclosed for turning scrap single ply roofing membrane, which consisted of a polyester woven fabric sandwiched in an envelope of polyvinyl chloride sheet, into an extruded product comprising a polyvinyl chloride matrix with discrete polyester fibers randomly dispersed therein. The product formed has been used for several years as elongate walk pads which can be placed on roofs to enable workmen to walk thereon without damaging the underlying surface while installing or repairing equipment on the roofs.

SUMMARY OF THE INVENTION

The present invention is concerned particularly with a method of making a cushiony decorative floor tile or wall cover from polyvinyl chloride sheet in which discrete fibers are randomly dispersed in a polyvinyl chloride matrix in a proportion to provide a cushiony product which, when used as a floor tile, has some "give" or compression, and reduces the fatigue factor for persons walking on the tile. Provided as an upper wear surface, is a transparent cover film of polyvinyl chloride material which provides or enhances a decorative effect. Because the cover and matrix are compatible, the cover film may be pressure heat welded to the matrix by autonomically preheating the cover film to a laminating temperature without necessitating the introduction of additional heat by heaters or the like which are external to the process. The preheating of the cover film to laminating temperature, may be achieved by passing the cover film along and adjacent to the path of the welded sheet, and adjacent to the extruded sheet as the latter passes into the nip between laminating rolls.

While the material used as the matrix or base principally is the material described in the aforementioned patent, it is to be understood that other recyclable polyvinyl chloride material which will incorporate high strength discrete fibers may also be used, or preferably used in combination with the material processed in the aforementioned patent. This variation may introduce other tough fibers such as nylon fibers to the matrix material. Thus, the fibers may also be formed of polyamide or aramid material as well as polyethylene terephthalate fibers, or other tough fibers which have sufficient yield strength and ductility and do not melt at the extrusion temperature.

One of the prime objects of the invention is to create a superior floor tile or wall cover out of recycled material which might otherwise need to be transported to the nation's ever increasing number of landfills at considerable expense.

Another object of the invention is to provide an improved decorative product consisting of a cushiony matrix, covered by a decorative sheet of a compatible material which can be laminated to the matrix without applying external heat in a most efficient and economical manner.

Still another object of the invention is to provide a decorative material which is tough, durable and resilient, and will not scuff or mar with normal long term use when employed either as a floor tile or wall cover.

Still a further object of the invention is to provide a cushiony resilient product which will accommodate the concentrated loads imparted by high heeled shoes without permanently denting the material.

Other objects and advantages of the invention will become apparent with reference to the accompanying drawings and the accompanying descriptive matter.

GENERAL DESCRIPTION OF THE DRAWINGS

FIG. 4 is a schematic side elevational view of apparatus which is used in the practice of the process.

Figure 2:
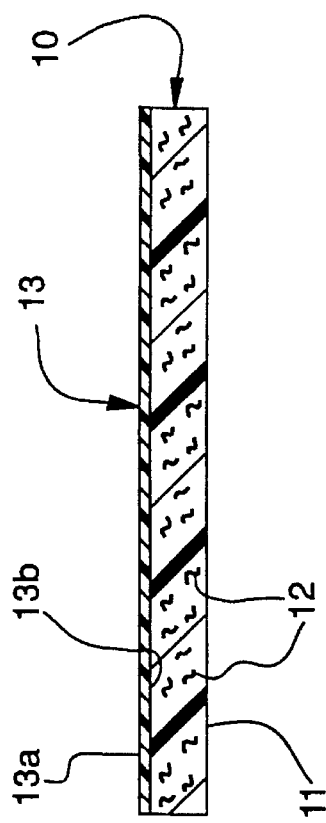
FIG. 2 is an enlarged transverse sectional view of the product formed in the process to be described, taken on the line 2—2 of FIG. 1.
Figure 3:
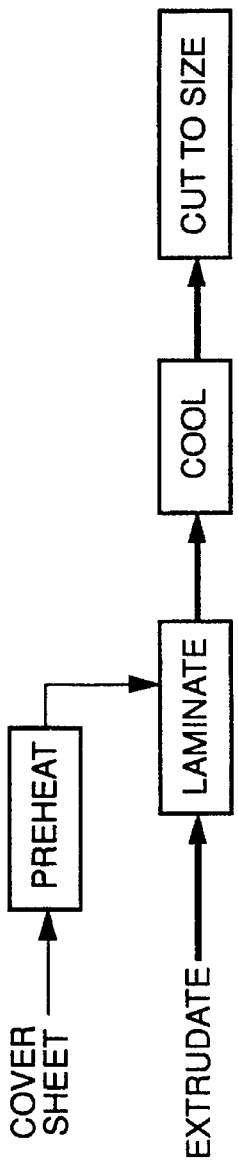
FIG. 3 is a block diagram depicting steps which are practiced in the process.
Figure 1:
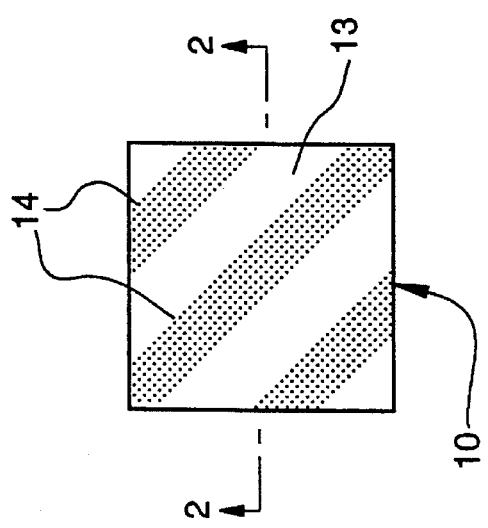
FIG. 1 is a top plan view of a floor tile formed in accordance with the invention.

Referring now more particularly to the drawings, and in the first instance to FIG. 1, the floor tile, which we have generally designated 10, comprises a matrix of polyvinyl chloride material 11, of a thickness generally in the range one-eighth to three-eighths of an inch, with randomly interspersed discrete fibers 12, which extrude in a solid state, embedded in the plastic matrix. Heat welded to the sheet 11 formed by the extrudate as it is extruded, is a transparent cover film 13, with an exterior surface 13a and an interior surface 13b. The surface 13b in FIG. 2 is shown as imprinted with a decorative imprint 14, which then is visible from the surface 13a of transparent cover film 13. The film 13 is a rigid polyvinyl chloride film.

In FIG. 4, an apparatus or system is disclosed for manufacturing the product on a continuous basis. Some of the components are those described in the aforementioned patent for processing the comminuted scrap material. For example, the discharge pipe 15 exiting from chopper housing 11 feeds pre-chopped particles of the material to be recycled to the hopper H of the extruder 18 described in the patent which disembodies the fabric in the manner described in the patent, prior to issuing it from an extrusion nozzle 19 having a flexible lip. As indicated, the extrudate issuing from the nozzle 19 may comprise thermoset polyester fibers randomly dispersed in a polyvinyl chloride matrix.

In the process of the present invention, the extruder nozzle is heated to maintain the temperature of the extrudate issuing from the nozzle at 300° F. to 350° F., and no less than about 300° F. Provided immediately adjacent the issuing orifice of nozzle 19, is the nip 20 maintained between a pair of tubular, heat controlled, vertically aligned laminating rolls 21 and 22. The rolls 21 and 22, which are revolved on shafts 21a and 22a, are maintained at a temperature of 240° F. and 160° F., respectively, by separate recirculating water or other heat transfer systems.

Provided above the rolls 21 and 22, in direct vertical alignment therewith, is a tubular coolant roll 23 which is revolved on a shaft 23a and maintained at a temperature of substantially 160° F. by another independent liquid recirculating system. Typically, the rolls 21–23 may be eighteen inches in diameter and will have heat transfer liquid circulating through them at a controlled rate. The material issuing from the extruder nozzle 19 remains at the thickness of extrusion as it enters nip 20. The film 13 is typically 4 to 6 mils in thickness and the thickness of the extrudate 11 will be such that the extrudate 11 plus the film 13 is ten to twenty percent oversized relative to the nip 20. For instance, when the nip 20 is one-quarter inch and the film 13 is 6 mils, the extrudate 11 will be at least 0.2465 inches in thickness so that compression occurs in the nip 20.

Provided above the nozzle 19 on a rotatable supply roll generally designated 24, is the rolled supply of film 13 which may typically be furnished on a removable core 25. To provide the tile with a granite-like appearance, for example, the clear or colored transparent film 13 will have been imprinted in the manner indicated with a decorative imprint 14 which is of high melt index and will not melt during the laminating process to be described. The film 13 proceeds downwardly as shown at a slow rate of speed adjacent to, but out of contact with, the roll 23 so as to be preheated by the adjacent laminated sheet 10 proceeding around roll 23. No more than an inch of clearance is maintained between the welded sheet 10 and the film 13 at the first preheating station 26 adjacent roll 23.

From the first preheating station 26, the film 13 proceeds downwardly to a second preheating station 27 adjacent to roll 21 and the extrudate 11 issuing from heated nozzle 19. The greater preheat is imparted at the second preheating station. By the time film 13 reaches the nip 20 and contacts the extrudate sheet in the heat welding step, it has been heated from ambient temperature to a laminating temperature of 240° F.–250° F. without any need for using heaters.

From the rolls 21 and 22, the sheet 10, which, due to the compression, has no air bubbles or wrinkles between its layers, proceeds up around roll 21 and on to cooling roll 23 which substantially lowers its temperature, prior to passing it on to a roller conveyor 28 on which it is air cooled to near ambient temperature. Rolls 29 and 30 draw the sheet downwardly to a table 31 at which the sheet is cut into lengths or strips. In the case of floor tile, the strips are removed to dies which typically cut the ambient temperature strips into 12 by 12 inch tile squares. In the case of wall covering or larger size floor covering, the strips are fed to other dies which cut them into appropriately sized pieces.

In order to obtain the cushiony resilient effect which will so affect the well-being of persons walking on the floor tile, while withstanding impressions made by concentrated loads such as those imparted by high-heeled shoes, for example, the fiber content is extremely important. The proportion by weight of discrete fibers will be 10% to 30% and desirably should not be greater to avoid a surface roughness or fuzziness on the substrate upper surface, which then is undesirably visible. Further, the fibers should be principally restricted to the range one-eighth to one-half an inch in length, and preferably the one-eighth to three-eighths length range, for the same reason. The fibers should be tough non-brittle fibers having a high impact and tensile strength i.e. polyester, polycarbonate, aramid, nylon, glass and carbon fibers as opposed to the common cloth natural fibers such as cotton. Nylon 6—6, for example, is typical and provides a tensile strength of 11,800 p.s.i., a 60% elongation factor, a flexural modulus of 400,000 p.s.i., and a compressive strength of 18,000 p.s.i.

Normally, the recycled material, prior to being supplied to the extruder for disembodiment of the fabric, is chopped in the manner disclosed in the aforementioned patent only sufficiently to pass through a round mesh screen of predetermined size. For example, to obtain fibers of substantially three-eighths of an inch in length, the mesh will have a diameter of three-eighths of an inch. It has been determined that seeking to reduce it with smaller size openings creates fuzz balls which cling to the particles and blind the screen openings. To achieve the desired size reduction the extruded material, after a first pass through the extruder, is cooled, without laminating the film 13 to it in the manner described herein. It is then simply again chopped up, and re-extruded. The three-eighths mesh screen can be used to achieve a progressive size reduction for as many pre-passes through the extruder as are required. It is, when the size reduction is achieved, typically after three repeat extrusionst that the film 13 is laminated in the manner described. To achieve the desired color to obtain the desired contrasting background for granite design imprinting, for example, pigment is normally added to the extruder mix. When the discrete fibers are too long, they tend to wrap around some of the pigment particulates and prevent their dissolution in the extruder. When the extrudate issues, it may, as a result, have an undesired spotting or streaking.

It is to be understood that the embodiments described are exemplary of various forms of the invention only and that the invention is defined in the appended claims which contemplate various modifications within the spirit and scope of the invention.

I claim:

1. A method of continuously fabricating a cushiony tough vinyl plastic floor or cover product having a decorative top side, comprising the steps of:

(a) in an extruder, extruding a single-ply sheet, made up substantially of recycled membrane and comprising a proportion of discrete tough fibers, sufficient to create a cushion effect in the product fabricated, randomly dispersed in a vinyl substrate, at an extruding temperature in which the membrane is in a soft plasticized hot state, of a semi-solidity in which it can be drawn under tensile load without substantially reducing in thickness;

(b) reducing said fibers principally to the one-eighth to three-eights of an inch range in length by cooling the sheet extrudate, chopping the sheet extrudate into particles in which the discrete fibers are reduced in length, and then passing said chopped extrudate into said extruder to reextrude it; and, as necessary to achieve the size reduction, repeating this step;

(c) when said reduction is achieved, immediately moving the single ply sheet while at substantially extruding temperature continuously into the nip between a pair of heat radiating laminating rolls;

(d) passing a solid state compatible polymer top side cover film product selected from the group comprising transparent sheet, colored sheet and sheet with decorative imprinting, closely alongside one of said laminating rolls to apply radiant preheat to it, and then passing it continuously into said nip with the single ply sheet;

(e) utilizing heat in said single ply sheet and the heat imparted by said one of said laminating rolls to bring said cover film product to bonding temperature while applying compressive pressure to autogeneously heat weld said single ply sheet and cover film product in surface to surface sealed contact, without the imposition of air bubbles or wrinkles between them, to form a welded product; and (f) cooling said welded single ply sheet and cover film product.

2. The process of claim 1 wherein said single ply sheet is in the range of three-thirty seconds of an inch to one-quarter of an inch in thickness and is polyvinyl chloride material.

3. The process of claim 2 wherein said welded product is cut into distinct sizes and adhesively applied over a flooring substrate in abutting contact to form a floor.

4. The process of claim 2 wherein said sheet with decorative printing is imprinted on an inner protected surface.

5. The process of claim 1 wherein said welded product is drawn from said pair of laminating rolls around a take-off roll in juxtaposed relation with said laminating rolls; and said cover film product, in proceeding to said laminating rolls, passes alongside and adjacent to, but out of contact with, said welded product traveling on said take-off roll to radiantly absorb heat from said welded product.

6. The process of claim 5 wherein said cover film product is preheated from ambient temperature to heat welding temperature by the time it is brought into welding contact with said substrate in said nip.

7. The process of claim 5 wherein the cover film product passes within one inch of the welded product passing around the take off roll.

8. The process of claim 1 wherein said fibers are fibers selected from the group of polyester, polycarbonate, nylon, aramid, glass and carbon fibers.

9. The process of claim 2 wherein the laminating nip is a maximum of one-quarter of an inch.

10. The product of claim 1 wherein said film comprises clear polyvinyl chloride material having a decorative imprinting on its interior surface.

11. A method of continuously fabricating a tough vinyl thermoplastic plastic floor or wall cover product comprising the steps of:

a) extruding a single ply sheet from an extruder made up substantially of recycled vinyl thermoplastic membrane incorporating a proportion of randomly dispersed discrete tough fibers at an extruding temperature in which the membrane is in a soft, plasticized hot state, of a semi solidity in which it can be drawn under tensile load without substantially reducing in thickness;

b) reducing said fibers principally to a ⅛th to ⅜th of an inch range in length by cooling the sheet extrudate produced, chopping the sheet extrudate into fine particles in which the discrete fibers are reduced in length, and then passing the chopped extrudate into said extruder to reextrude it;

c) when reduction is achieved, and, as necessary to achieve size reduction, repeating this step; and d) moving the single ply sheet formed while at substantially extruding temperature in said hot state continuously into the nip between a pair of sheeting rolls for further processing.

12. The method of claim 11 wherein said fibers comprise in the neighborhood of 10–30 percent of said substrate by weight.

13. The method of claim 11 wherein the fibers are thermoset polyester fibers dispersed in a vinyl single ply sheet.

14. A method of continuously fabricating a cushiony tough vinyl plastic floor or cover product having a decorative top side, comprising the steps of:

(a) in an extruder, extruding a single-ply sheet, made up substantially of recycled vinyl membrane and comprising a proportion of discrete tough fibers, sufficient to create a cushion effect in the product fabricated, randomly dispersed in a vinyl substrate, at an extruding temperature in which the membrane is in a soft plasticized hot state, of a semi-solidity in which it can be drawn under tensile load without substantially reducing in thickness;

(b) moving the single ply sheet from said extruder at substantially extruding temperature continuously into the nip between a pair of heat radiating laminating rolls and from there around a take off roll;

(c) passing a preheated solid state compatible polymer top side cover film product selected from the group comprising transparent sheet, colored sheet and sheet with decorative imprinting, closely alongside one of said laminating rolls to apply radiant preheat to it, and then passing it continuously into said nip with the single ply sheet;

(d) utilizing heat in said single ply sheet and the heat imparted by said one of said laminating rolls to bring said preheated cover film product to bonding temperature while applying compressive pressure to autogeneously heat weld said single ply sheet and cover film product in surface to surface sealed contact, without the imposition of air bubbles or wrinkles between them, to form a welded product; and (e) prior to step (c) passing said cover film product closely adjacent the welded product proceeding around said take off roll to provide radiant preheat to it; and (f) cooling said welded single ply sheet and cover film product.

15. The process of claim 14 wherein said single ply sheet is in the range of three-thirty seconds of an inch to one-quarter of an inch in thickness and is polyvinyl chloride material.

16. The process of claim 14 wherein said welded product is cut into distinct sizes and adhesively applied over a flooring substrate to form a floor.

17. The process of claim 14 wherein said cover film product is said sheet with decorate printing which is imprinted on an inner protected surface.

18. A method of continuously fabricating a cushiony tough vinyl plastic floor or cover product comprising the steps of:

(a) in an extruder, extruding a single-ply sheet, made up substantially of recycled membrane and comprising a proportion of discrete tough fibers, sufficient to create a cushion effect in the product fabricated, randomly dispersed in a vinyl substrate, at an extruding temperature in which the membrane is in a soft plasticized hot state, of a semi-solidity in which it can be drawn under tensile load without substantially reducing in thickness;

(b) reducing said fibers principally to the one-eighth to three-eighths of an inch range in length by cooling the sheet extrudate, chopping the sheet extrudate into particles in which the discrete fibers are reduced in length, and then passing said chopped extrudate into said extruder to reextrude it; and if necessary to achieve the size reduction, repeating this step;

(c) when said reduction is achieved, immediately moving the single ply sheet while at substantially extruding temperature continuously into the nip between a pair of heat radiating laminating rolls;

(d) passing a polymer top film selected from the group comprising transparent sheet, colored sheet, and sheet with decorative imprinting, continuously into said nip with the single ply sheet;

(e) applying compressive pressure to autogeneously heat weld said single ply sheet and top film in surface to surface sealed contact, without the imposition of air bubbles or wrinkles between them, to form a welded product; and (f) cooling said welded single ply sheet and top film.

* * * * *